Oct. 22, 1946.  R. J. L. MOINEAU  2,409,688
REVERSIBLE FLUID-OPERATED AND FLUID-OPERATING MECHANISM
Filed Jan. 9, 1945
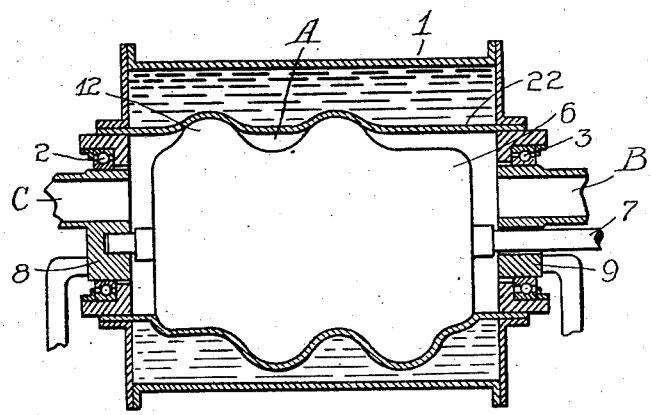
René Joseph Louis Moineau
INVENTOR
BY
his ATTORNEY Patented Oct. 22, 1946

2,409,688

UNITED STATES PATENT OFFICE 2,409,688

REVERSIBLE FLUID-OPERATED AND FLUID-OPERATING MECHANISM

René Joseph Louis Moineau, Paris, France

Application January 9, 1945, Serial No. 572,080
In France July 1, 1942

1 Claim. (Cl. 103—117)

The present invention relates to a reversible rotating mechanism which may be embodied, at the same time or separately, in a prime mover or in a compressor, a pump or any other apparatus for the reversible conversion of a fluid motion into a rotation of mechanical parts.

The said rotating mechanism is of the type comprising a rotatable casing and a rotor mounted rotatably in said casing about an eccentric axis and provided with a helical projection or screw-thread. The annular space between the rotor and the casing contains a body of liquid and its opposite ends are respectively in communication, near the axis, with an inlet and an outlet. In operation, said liquid is set in rotation by viscosity and forced by centrifugal force against the inner wall of the casing and the outer part of the helical projection on the rotor has a screw-like movement therein.

In accordance with the invention, the rotor is surrounded by a flexible tubular diaphragm secured at both ends in the casing, the liquid being contained in the annular space around said diaphragm.

The accompanying drawing shows by way of example, in a single figure, in longitudinal section, an embodiment of the improved mechanism.

As shown in the drawing the apparatus comprises a cylindrical casing 1 rotatably mounted by ball-bearings 2 and 3 on stationary end walls 8, 9 provided respectively with an inlet B and an outlet C. The casing is closed inwardly by a tubular diaphragm 22 made of a flexible material, for instance rubber. The annular space between the diaphragm and the casing contains a body of liquid which thus forms a liquid ring.

In the cylindrical space inside the diaphragm, is a rotor 6 secured on a shaft 7 rotatably supported at both ends, in an eccentric position, in the end walls 8, 9. The shaft 7 carries a pulley or a similar transmission member not shown.

Rotor 6 is provided at its periphery with a helically wound partition or toothing 12 whose outer edge is preferably rounded as shown, the diameter of said toothing being such that its outer portion forces the flexible diaphragm outwardly.

If the device is used as a pump or compressor, power is applied to shaft 7, the rotor 6 will thus rotate and the diaphragm will be carried along in the rotation due to its contact with the helical toothing of the rotor. The casing 1 will thus rotate, together with the body of liquid or liquid ring.

A continuous pumping chamber A is thus formed between the inner part of the rotor thread and the diaphragm. During the rotation, said chamber is displaced axially and the fluid to be delivered proceeds from the inlet end B to the outlet end C.

It will be observed that the proper operation of such a type of pump or compressor requires a definite speed ratio between the casing and the rotor. If a positive connection were provided between the two elements, it would be difficult to provide for the best speed ratio, inasmuch as it varies with various factors. On the other hand, if the casing is merely driven by the effect of the viscosity of the liquid ring, i. e. if the diaphragm is missing, the lag of the casing cannot be controlled. The flexible diaphragm, carried by the casing and in contact with the rotor, affords a suitable connection and the best efficiency is secured.

It may also be noted that the rotor substantially rolls on the inner surface of the diaphragm so that the friction losses are reduced to a minimum.

If a fluid under pressure is injected into inlet B, the shaft 7, once set in rotation, will continue to rotate under the action of the fluid and the device will work as a prime mover.

Having now described my invention what I claim as new and desire to secure by Letters Patent is:

In a mechanism of the class referred to, a rotor having a helical projection, a receptable enclosing said rotor and loosely rotatable about an eccentric axis, a flexible membrane coaxial with said receptacle and limiting therein an annular space and a central chamber, an inlet and an outlet respectively in communication with the opposite ends of said chamber, a body of liquid in said annular space adapted to be driven in rotation by viscosity and forced by centrifugal force against the inner wall of said receptacle, the edges of said projection being adapted to depress said membrane outwardly and have a screw-like movement therein, thus forming at least one axially movable fluid-tight cell, said receptacle being adapted to be driven by friction of said membrane against said helical projection.

RENÉ JOSEPH LOUIS MOINEAU.